April 29, 1952  T. J. LOCKWOOD  2,595,151

POTATO WAXING MACHINE

Filed June 26, 1950

INVENTOR.
THORVAL J. LOCKWOOD
BY
*[signature]*
ATTORNEY

Patented Apr. 29, 1952

2,595,151

UNITED STATES PATENT OFFICE 2,595,151

POTATO WAXING MACHINE

Thorval J. Lockwood, Gering, Nebr.

Application June 26, 1950, Serial No. 170,371

4 Claims. (Cl. 118—13)

This invention relates to a device for applying wax to potatoes and other vegetables and fruits, and has for its principal object the provision of a device which will apply a uniform and complete impervious coating to each potato in a continuously moving stream of potatoes.

Another object of the invention is to so construct the device that it will operate efficiently and continuously without attention on the part of the operator.

A further object is to so construct the device that it can be applied to conventional potato washing and grading machines without change in the latter.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Figure 1:
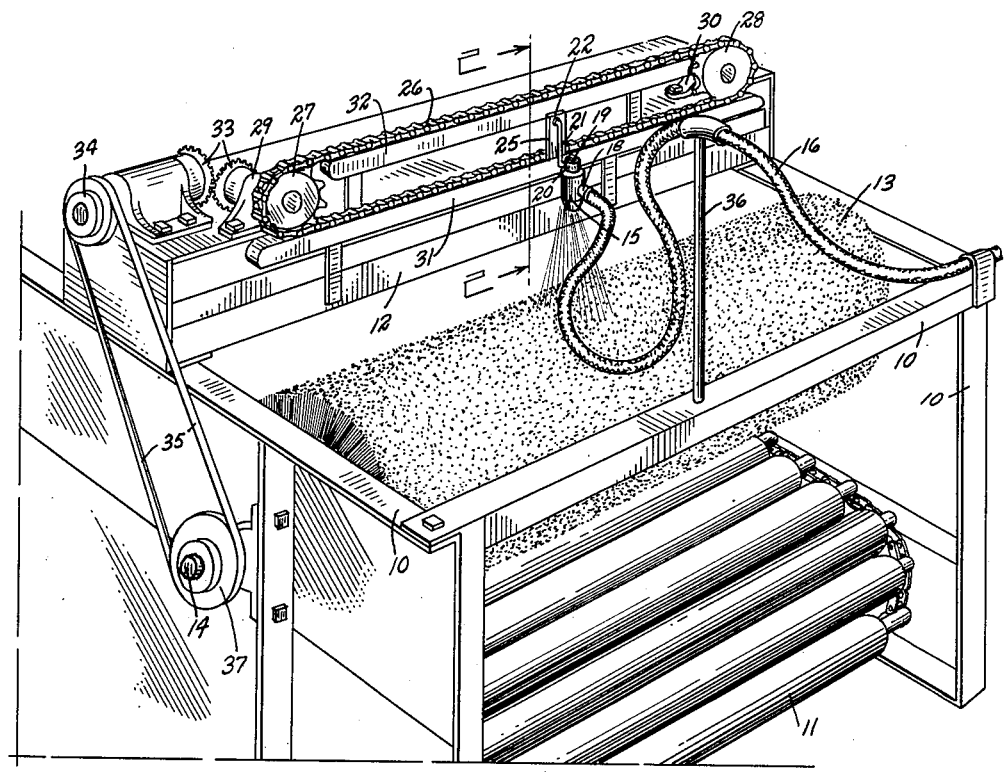
Fig. 1 is a perspective view of a conventional potato washing and grading machine, illustrating the invention in place thereon.

In Fig. 1, a conventional potato washing and grading machine is indicated at 10, with its traveling roller conveyor at 11. The improved waxing machine employs an elongated frame 12 adapted to be placed across the frame of the grading and washing machine 10 and secured thereto in any desired manner, such as indicated in Fig. 1.

A relatively large, cylindrical, flexible bristle waxing brush 13 is mounted in the machine 10 on a brush shaft 14 above the conveyor 11 and below the frame 12. A traveling nozzle 15 is supported above the brush 13 and supplied with liquid wax through a flexible hose 16. The nozzle travels back and forth so as to continuously apply wax thereto throughout the full length of the brush. The brush is rotated in any desired manner from the machine 10 so as to carry the wax to and spread it on potatoes traveling with and rolling on the conveyor 11. The conveyor 11 is of the conventional type, consisting of a plurality of closely spaced rollers which constantly rotate to turn and roll the potatoes as they pass beneath the flexible waxing brush 13 so that the wax will be uniformly applied to all the potato surfaces.

The nozzles 15 contains a vertical, central bore 17 from which the wax sprays, and a side nipple 18 which connects with the hose 16 and communicates with the bore 17 to supply wax thereto. The upper portion of the bore 17 is threaded to receive a cap screw 19 which extends through and is rotatable in a supporting collar 20. An L-shaped bracket arm 21 extends upwardly and outwardly from the collar 20 and through a bearing sleeve 22, in which it is secured by means of a retaining washer 23 and cotter key 24.

The bearing sleeve 22 is fixed in and supported from an angle clip 25 which is welded or otherwise secured on the outside face of a continuous endless chain 26. The chain 26 extends between a drive sprocket 27 and a driven sprocket 28 mounted in bearings 29 and 30, respectively, supported by the frame 12. The intermediate reaches of the chain 26 are supported upon a lower track bar 31 and an upper track bar 32.

The drive sprocket 27 is driven through the medium of bevel gears 33 from a belt pulley 34. A V-belt 35 leads to any rotating member of the potato washing and grading machine. As illustrated, the belt is trained around a drive pulley 37 on the brush shaft 14.

Figures 2, 3:
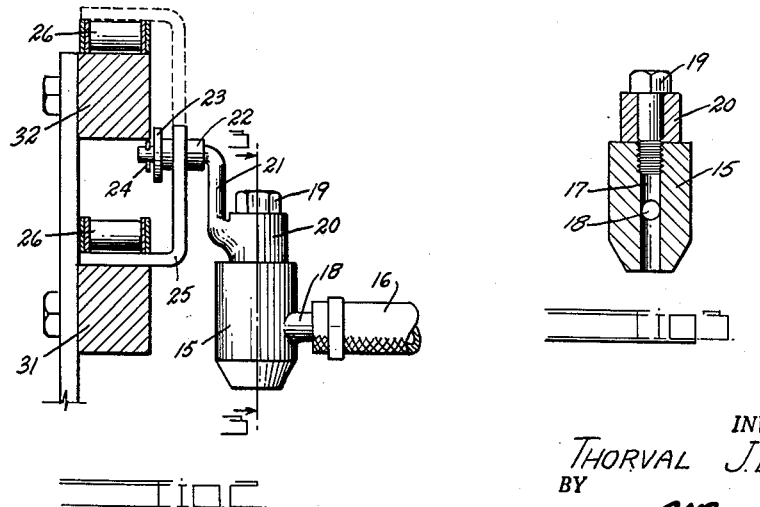
Fig. 2 is an enlarged cross-section, taken on the line 2—2, Fig. 1.
Fig. 3 is a still further enlarged, detail cross-section, taken on the line 3—3, Fig. 2.

Let us assume that the drive sprocket 27 is rotating in a clockwise direction in Fig. 1. This causes the lower reach of the chain to move to the left and the upper reach to move to the right. This acts to carry the clip 25 to the left along the lower track bar 31 in an upwardly extending position, as shown in solid line in Fig. 2. When the sprocket 27 is reached, the clip rotates about the sprocket to the top reach of the chain, where it moves to the left in a downwardly depending position, as indicated in broken line in Fig. 2.

The length of the clip 25 is so related to the spacing of the chain reaches that the bearing sleeve 22 will travel in both directions in the same horizontal plane. The weight of the nozzle 15 causes it to always depend downwardly during the entire travel thereof. The hose 16 is supported in a hose bracket 36 so that it can easily follow the movements of the nozzle. It will be noted that, since the nozzle is rotatable in a horizontal plane about the axis of the collar 20, no stress or strain is placed in the hose, since the nozzle can swing back and forth during its travel. The hose is, of course, connected to any suitable source of liquid wax under pressure.

While a specific form of the improvement has been described and illustrated herein, it is to

Having thus described the invention, what is claimed and desired secured by Letters Patent is:

1. Means for waxing potatoes as they are carried along on a conveyor, comprising: a rotatable, horizontal cylindrical brush mounted above and transversally of said conveyor; means for rotating said brush; a supporting frame mounted above and parallel to said brush; a drive sprocket adjacent one extremity of said frame; a similar driven sprocket adjacent the other extremity thereof in horizontal alignment with said drive sprocket; an endless chain trained about said sprockets so as to travel horizontally parallel to said brush; means for driving said sprockets; a spray nozzle; means for supplying liquid wax to said nozzle; an angle clip secured to said chain and positioned to extend inwardly from one reach thereof toward the other reach thereof; and a hanger member hinged to said clip at a point substantially on a line extending between the axes of said sprockets and suspending said nozzle from said clip so that the nozzle will travel back and forth in a horizontal plane with the movement of the chain.

2. Means for waxing potatoes as they are carried along on a conveyor, comprising: a rotatable, horizontal cylindrical brush mounted above and transversally of said conveyor; means for rotating said brush; a supporting frame mounted above and parallel to said brush; a drive sprocket adjacent one extremity of said frame; a similar driven sprocket adjacent the other extremity thereof in horizontal alignment with said drive sprocket; an endless chain trained about said sprockets so as to travel horizontally parallel to said brush; means for driving said sprockets; a spray nozzle; means for supplying liquid wax to said nozzle; upper and lower track bars supporting the upper and lower horizontal reaches of said chain, respectively; an angle clip secured to said chain so as to extend upwardly when traveling along the lower track bar and downwardly when traveling along the upper track bar; and means for swingingly suspending said nozzle from said clip said latter means being attached to said clip at a distance from said chain equal to the radius of said sprockets so that the point of attachment will follow a horizontal line parallel to and medial of the two reaches of said chain.

3. Means for waxing potatoes as they are carried along on a conveyor, comprising: a rotatable horizontal cylindrical brush mounted above and transversally of said conveyor; means for rotating said brush; a supporting frame mounted above and parallel to said brush; a drive sprocket adjacent one extremity of said frame; a similar driven sprocket adjacent the other extremity thereof in horizontal alignment with said drive sprocket; an endless chain trained about said sprockets so as to travel horizontally parallel to said brush; means for driving said sprockets; a spray nozzle; means for supplying liquid wax to said nozzle; upper and lower track bars supporting the upper and lower horizontal reaches of said chain, respectively; an angle clip secured to said chain so as to extend upwardly when traveling along the lower track bar and downwardly when traveling along the upper track bar; a horizontal bearing sleeve carried by said clip, said bearing sleeve being positioned in said clip at a distance from said chain equal to the radius of said sprockets so that said sleeve will follow a horizontal line parallel to and medial of the two reaches of said chain; a hanger member rotatably mounted in said sleeve and extending downwardly therefrom; a collar supported by said hanger member; and means for rotatably supporting said nozzle in said collar.

4. Means for waxing potatoes as they are carried along on a conveyor as described in claim 3 in which the means for driving said sprockets comprises power transmitting means between said brush and said sprockets and acting to transmit rotation to the latter from the former.

THORVAL J. LOCKWOOD.

REFERENCES CITED

The following references are of record in the file of this patent:

UNITED STATES PATENTS

| Number | Name | Date |
| --- | --- | --- |
| 1,183,672 | Ritchey et al. | May 16, 1916 |
| 1,736,759 | Brogden | Nov. 19, 1929 |
| 1,757,528 | Inman | May 6, 1930 |
| 1,868,850 | Purinton | July 26, 1932 |
| 1,929,896 | Merritt et al. | Oct. 10, 1933 |
| 2,083,633 | Brackett | June 15, 1937 |
| 2,153,295 | Brogden | Apr. 4, 1939 |
| 2,293,881 | Bailey | Aug. 25, 1942 |
| 2,430,187 | Recker | Nov. 4, 1947 |